Figure 3:
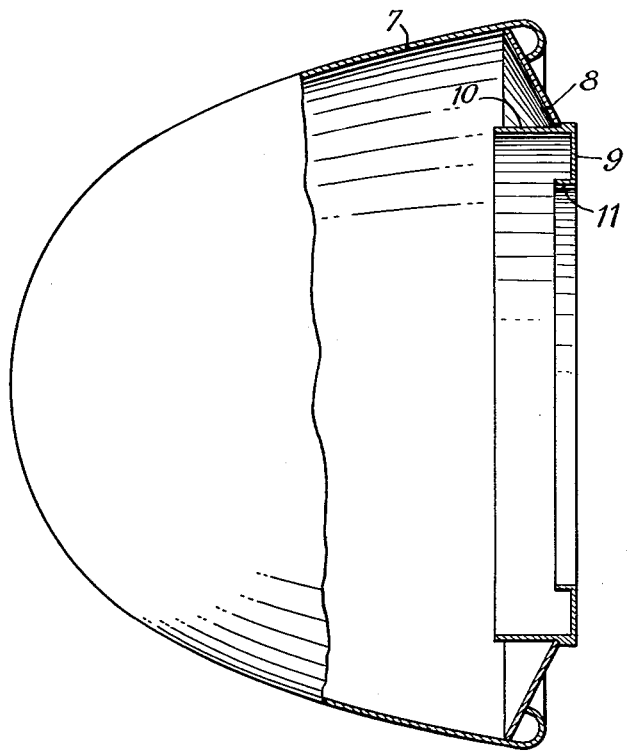

Sept. 12, 1961 F. MOTTIER ET AL 2,999,924
ANTI-FOG LIGHTING PROJECTOR
Filed Sept. 3, 1958 2 Sheets-Sheet 1
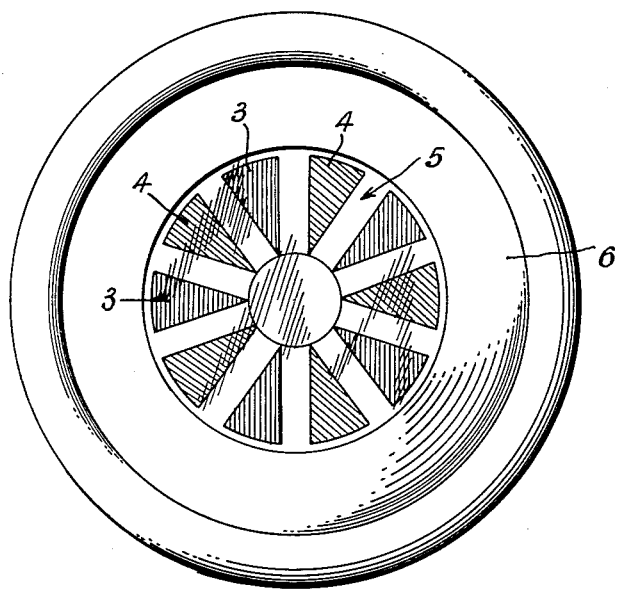
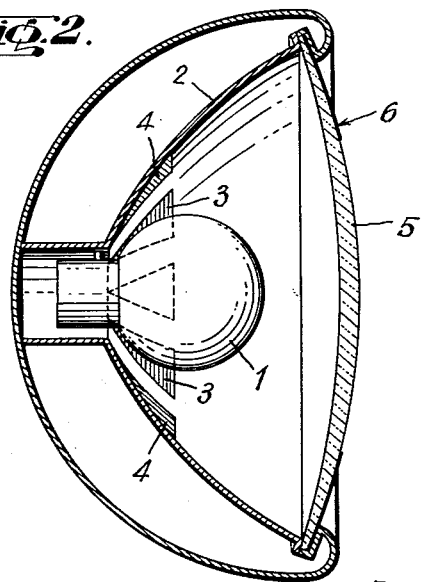
INVENTORS
FELIX MOTTIER
EDOUARD MOTTIER
By Kurt Kelman
Their Agent Sept. 12, 1961  F. MOTTIER ET AL  2,999,924
ANTI-FOG LIGHTING PROJECTOR
Filed Sept. 3, 1958  2 Sheets-Sheet 2

INVENTORS
FELIX MOTTIER
EDOUARD MOTTIER
BY Kurt Kelman
Their Agent

2,999,924
ANTI-FOG LIGHTING PROJECTOR
Félix Mottier and Edouard Mottier, Chamby-sur-Montreux, Switzerland
Filed Sept. 3, 1958, Ser. No. 758,843
Claims priority, application Switzerland Sept. 10, 1957
9 Claims. (Cl. 240—41.35)

The anti-fog headlights used up to the present do not give entire satisfaction. The distance at which they are visible in the fog is rather short and they produce luminous rays which are strongly reflected on an intense fog. The said headlights mounted on motor vehicles, for example, dazzle drivers coming in the opposite direction as well as the driver of the car carrying the headlight.

The aim of the present invention is to obtain a lighting projector which does not offer these drawbacks, in which the luminous range is greatly improved as against that of known projectors and gives a light such that the fog is rendered practically transparent over a distance sufficient for practical purposes.

The lighting projector under consideration may be the headlight of a car or of any other land vehicle, a headlight of a ship or airplane, or a light used for public lighting or ground lighting.

The anti-fog lighting projector which is the object of the present invention is characterized in that it includes a source of light rays, a reflector disposed around the source, reflecting coloured areas disposed on the surface of the reflector around the source, a front glass, and a reflecting crown disposed on the periphery of the glass in order to reflect the divergent rays inside the reflector.

The accompanying drawing shows, by way of example, two embodiments of the projector according to the invention.

FIG. 1 is a front view of the first embodiment.
FIG. 2 is an axial cross section of the same.
FIG. 3 is a partial cross section of the second embodiment.

The projector shown in FIGS. 1 and 2 includes a yellow luminous source of light rays 1 (shown only in FIG. 2), around which is disposed a parabolic reflector 2. The reflecting surface of the reflector 2 is provided, around the source 1, with reflecting coloured areas formed by red isosceles triangles 3 and green isosceles triangles 4 disposed alternately around the source. The said coloured areas may be formed by a coloured coating laid on the surface of the reflector. They could be affixed to the said surface, for example by gluing by means of an adhesive or by stamping. In the case of a coating, the latter may itself be reflecting, or transparent so that the reflection of the light occurs on the surface of the reflector.

The projector includes a curved glass 5 provided on its periphery with a reflecting crown 6, adapted to reflect inside the reflector 2 the luminous rays of the source 1 which reach the said crown. The latter may be constituted by a mirror formed on the glass 5 or affixed thereto. It could be constituted by a metallic ring the surface of which on the side of the source is reflecting.

When the projector is in operation, the yellow luminous rays emitted by the source 1 are thrown back by the reflector principally in an axial direction and leave by the central portion of the glass 5. The colour of certain of the said rays is modified by the coloured areas 3 and 4, and the resultant beam which is projected by the reflector is visible at a considerable distance in the fog. The rays produced by the source 1, necessarily not pin-point, are not all reflected in an axial direction. There exist divergent rays which strike the crown 6. The latter reflects them and diffuses them inside the reflector 2, a portion of the said diverging rays ending by passing through the glass 5. There is thus obtained a lighting beam more intense and having a diffusion of the colours which is more complete than in the absence of the crown. The latter strongly reduces the halo which is ordinarily formed around projectors operating in a fog.

In the projector described, the coloured areas are in the shape of red and green isosceles triangles. They could be of any other shape and of any other colours. The visibility in the fog of light produced by the projector depends on the colour or the colours chosen for the coloured areas and on the colour of the source. The coloured areas may be of a single colour or of several colours.

The reflector is not necessarily parabolic, its shape may vary according to the use under consideration for the projector.

In the first embodiment shown in FIGS. 1 and 2, it happens that certain divergent rays are not brought into the principal beam and still produce a certain halo around the projector. The second embodiment shown in FIG. 3 has for its aim to remove this drawback.

The projector shown in FIG. 3 includes a reflector 7 and a reflecting crown 8 adapted to throw back inside the reflector the divergent rays which reach it. A ring 9 is mounted in the said crown and includes a first annular flange 10 on its outer periphery, the said flange projecting inside the reflector, and a second annular flange 11 on its inner periphery, the flange 11 also projecting inside the reflector but a shorter distance than the first flange 10. The ring 9 carries a glass (not shown) closing the reflector in the usual manner, mounted in the annular space defined inside the annular flange 11.

When the projector is in operation, the divergent rays produced by the luminous source strike against the crown 8 which reflects them on to the inner surface of the reflector 7. Certain of the said rays are reflected by the latter in a direction such that, in the absence of the ring 9, they would leave the reflector in a diverging direction relative to the principal beam produced by the projector. The greater portion of the said rays, after reflexion on the surface of the reflector 7, pass between the flanges 10 and 11 and strike against the latter or the inner surface of the ring 9. The greater portion of the divergent rays are thus eliminated, considerably improving the lighting produced by the projector.

The ring 9 could include at least one other flange disposed between the flanges 10 and 11, also projecting inside the reflector a distance intermediate between the distances of projection of the said flanges 10 and 11. Instead of being perpendicular to the plane of the ring 9, as shown, the flanges could be at any angle relative to the said plane.

The inner surface of the crown 8 may be provided with reflecting coloured areas arranged around the said inner surface, the said areas being of at least one colour. The lighting power of the projector is thus improved.

What we claim is:
1. An anti-fog lighting projector comprising a source of light rays, a reflector member defining a cavity around the source, said cavity having an opening for the outward passage of light from said source, reflecting coloured areas disposed on the surface of the reflector member around the source, and a reflecting crown secured to said reflector member and disposed on the periphery of said opening in order to reflect the divergent rays inside the reflector.

2. A projector according to claim 1, wherein said areas are of two colours disposed alternately around the source.

3. A projector according to claim 2, wherein the source is yellow and the said areas alternately red and green.

4. A projector according to claim 1, wherein said areas have the shape of isosceles triangles.

5. A projector according to claim 1, wherein said areas are constituted by a coloured coating disposed on the surface of the reflector member.

6. A projector according to claim 1, wherein said areas are affixed to the surface of the reflector member.

7. A projector according to claim 1, further comprising a ring mounted inside the crown and comprising on its outer periphery a first annular flange projecting into the reflector and on its inner periphery a second annular flange projecting into the reflector a distance shorter than the first flange.

8. A projector according to claim 7 wherein said flanges are perpendicular to the plane of the ring.

9. A projector according to claim 1, wherein said crown is provided with coloured areas on its inner surface.

References Cited in the file of this patent

UNITED STATES PATENTS

| | | |
|---|---|---|
| 1,735,209 | Nelson | Nov. 12, 1929 |
| 2,041,412 | Homrighous | May 19, 1936 |
| 2,216,156 | Bristow | Oct. 1, 1940 |
| 2,217,790 | Boynton | Oct. 15, 1940 |
| 2,466,430 | Hutchison | Apr. 5, 1949 |

FOREIGN PATENTS

| | | |
|---|---|---|
| 262,898 | Great Britain | Dec. 23, 1926 |
| 541,756 | Great Britain | Dec. 10, 1941 |